Patented Jan. 13, 1942

2,270,180

UNITED STATES PATENT OFFICE 2,270,180

INSOLUBILIZATION OF WATER-SOLUBLE CELLULOSE ETHERS

Shailer L. Bass and Richard M. Upright, Midland, Mich., assignors to The Dow Chemical Company, Midland, Mich., a corporation of Michigan No Drawing. Application September 26, 1940, Serial No. 358,423

16 Claims. (Cl. 260—15)

This invention relates to a method of insolubilization of water-soluble cellulose ethers, whereby such ethers are made to be insoluble in organic solvents and substantially insoluble in water. It relates in particular to such a method applied to methyl cellulose of the water-soluble type.

Water-soluble cellulose ethers have certain characteristics which make them superior for some purposes to their organo-soluble counterparts. Their solubility in water also is an advantage, particularly where economy of operation and freedom from the expense and hazard incident to the use of volatile organic solvents is desired. At the same time, water-solubility may not be a desirable attribute in the finished article, whether it be free film, filament or a coating on paper, cloth, or like flexible base. Thus, for abrasion-resistance of the article and for simplicity and economy of operation in producing the same, it may be desired to use a water solution of a water-soluble cellulose ether. It may, at the same time, be desired to have the finished article insoluble, or substantially so, in water and insoluble in organic solvents. Further, it may be desired that the cellulose ether in the finished article exhibit flexibility and possess a degree of clarity comparable with the corresponding properties of the customary organo-soluble cellulose ethers which might be used for analogous purposes.

It is accordingly an object of the invention to provide a method whereby water-soluble cellulose ethers may be employed in, or applied from, water solution and then insolubilized, both as regards water and organic solvents, by simple and inexpensive means. Another object is to provide a predominantly cellulose ether composition, where the cellulose ether is of the water-soluble type, which is capable of being converted easily to a substantially water-insoluble form. A particular object of the invention is to provide a method and a composition as aforesaid whereby water-soluble methyl cellulose may be converted to an insoluble form. Other and related objects will appear hereinafter.

According to the invention, the foregoing and related objects may be attained by adding to a water solution of a water-soluble cellulose ether from about 10 to about 25 per cent, based on the weight of said ether, of a water-soluble polyhydric alcohol modified urea-formaldehyde resin, then employing the solution to cast films or to make filaments or to coat articles, and finally drying and heating the so-formed films or filaments or coatings at a temperature of from 90° to 170° C. for periods varying correspondingly within the range from 150 to 10 minutes. The reaction whereby the article is insolubilized is preferably carried out in the presence of catalytic quantities of phosphoric acid, or other acidic catalyst for the setting of urea-formaldehyde resins.

The cellulose ethers here concerned include such water-soluble products as, for example, methyl cellulose, hydroxy-ethyl cellulose, and the alkali and ammonium salts of cellulose glycolic acid.

The polyhydric alcohol modified urea-formaldehyde resin which has been found most satisfactory in the practice of the invention is one which may be made from 1 mole of urea, 1 to 5 moles of ethylene glycol and 3 moles of formaldehyde, as described by Hodgins and Hovey in U. S. Patent No. 2,168,477.

In a preferred method of carrying out the invention, there is added to a water solution of methyl cellulose from about 10 to about 25 per cent of a water-soluble ethylene glycol modified urea-formaldehyde condensate, based on the weight of methyl cellulose, and an acid catalyst, such as phosphoric acid, in amount sufficient to lower the pH of the water solution to about 4 to 5. The solution is used to cast a film, or to form a filament, or to coat an article, and the so-formed product is dried to remove water, and then heated for from 10 to 150 minutes at temperatures from 170° to 90° C. The lower temperatures require somewhat longer times to arrive at an insoluble product than do the higher temperatures within the recited range. The so-heated articles are substantially insoluble in water and are insoluble as well in most common organic solvents. If much less than about 10 per cent of the urea-formaldehyde product is incorporated in the methyl cellulose, it is found that no practical amount of heating will give a water-insoluble product. Similarly, if much more than about 25 per cent of the polyhydric alcohol modified urea-formaldehyde condensate is employed, the product obtained, while less soluble in water than is methyl cellulose alone, is more soluble than when from 10 to 25 per cent of resin is used. Further, the use of more than 25 per cent of the aforesaid modified urea-formaldehyde condensate materially reduces the degree of flexibility which it is possible to obtain in the finished films, filaments, or coatings.

To illustrate the effect of time and of urea-formaldehyde concentration on the insolubilization of methyl cellulose, the following table is given. The methyl cellulose employed was of such a type that a 2 per cent solution in water has a viscosity of about 77 centipoises. The urea-formaldehyde product was a condensate of 1 mole of urea, from 1 to 5 moles of ethylene glycol, and 3 moles of formaldehyde, and was obtained commercially under the designation "Beckamine P-2." Water solubility was determined by immersion of the weighed, heat-treated samples in water for 48 hours at room temperature, re-drying, and weighing. The temperature at which the samples were insolubilized was 160° C. No acid catalyst was employed in the runs reported in Table I.

TABLE I

*Effect of time and component ratios on solubility of baked urea-formaldehyde methyl cellulose films*

| Time in minutes at 160° C. | Glycol-urea-formaldehyde, per cent | | |
|---|---|---|---|
| | 15 | 20 | 25 |
| 5 | | | 10 |
| 30 | 76.3 | 21.4 | |
| 60 | 23.6 | 10.5 | 5.0 |
| 90 | 10.9 | 8.2 | |
| 120 | 8.2 | 7.3 | 4.6 |

A comparable series of runs was made using various acid catalysts in amount sufficient to bring the pH of the acid solution from which the films were cast to a value between 4 and 5. The ingredients were otherwise the same, and the temperature at which the films were heated to effect insolubilization was 160° C. The data given in Table II show a comparison of samples containing phosphoric acid and samples containing no catalyst.

TABLE II

*Insolubilizing effect of phosphoric acid*

| Time in minutes at 160° C. | Glycol-urea-formaldehyde, per cent | | | |
|---|---|---|---|---|
| | No catalyst | | | Catalyst $H_3PO_4$ |
| | 13 | 16.7 | 20 | 13 |
| 5 | | | 11 | 5 |
| 30 | 77 | 21 | | 3 |
| 60 | 24 | 11 | 5 | 3 |
| 90 | 11 | 8 | 5 | 3 |
| 120 | 8 | 7 | 5 | 2.5 |

It is seen that with an effective catalyst there can be obtained as great an insolubilizing effect in a given time using only 13 per cent of the glycol-modified urea-formaldehyde condensate as when using 20 per cent of the same condensate without an acid catalyst. Similar results are obtained using citric acid to reduce the pH of the water solution to about 4 to 5.

Solutions were made, having pH 4, containing as the solid ingredients 87 parts of methyl cellulose and 13 parts of the Beckamine P-2, previously described. Two solutions contained phosphoric acid as the catalyst, and another solution contained citric acid. Films were cast from the various solutions, dried, and heated at the indicated temperature. The solubility of the various products was observed after the indicated heating periods. The data appear in Table III.

TABLE III

*Insolubilizing effect of various catalysts*

| Time in minutes | Catalyst and temperature | | |
|---|---|---|---|
| | $H_3PO_4$ 160° C. | $H_3PO_4$ 100° C. | Citric acid 100° C. |
| 5 | 5 | 23 | 56 |
| 15 | 3 | 21 | 37 |
| 30 | 3 | 20 | 28 |
| 60 | 3 | 21 | 25 |

From the foregoing data it is observed that, when no catalyst is employed, minimum solubility in water is obtained when the films are heated for about 120 minutes at 160° C., while catalyzed compositions reach minimum solubility at this heating temperature in about 15 minutes. Temperatures much higher than about 170° C. are impractical because of discoloration of the film, while those below 90° C. fail to produce insolubilization within a reasonable period of time, if at all.

The invention has been illustrated with respect to the insolubilization of normally water-soluble methyl cellulose. It applies as well to a like change in properties of other normally water-soluble cellulose ethers, including hydroxy ethyl cellulose, and the like. The invention may be used to convert water-soluble cellulose ethers to water-insoluble products other than the films herein described. Thus, it may apply to filaments, tapes, or coatings provided that the coated article can withstand the temperatures employed in the process. When operating in the preferred ranges of proportion, time, and temperature, the treated films are flexible, substantially insoluble, and are practically free from discoloration.

Other modes of applying the principle of our invention may be employed instead of the one explained, change being made as regards the method herein disclosed, provided the step or steps stated by any of the following claims or the equivalent of such stated step or steps be employed.

We, therefore, particularly point out and distinctly claim as our invention:

1. The method which comprises dissolving in a water solution of a water-soluble cellulose ether from about 10 to about 25 per cent based on the weight of said ether of a water-soluble polyhydric alcohol modified urea-formaldehyde condensate, drying the mixture to remove water and heating the mixed solids to a temperature between about 90° and 170° C. for a period within the range from 150 to about 10 minutes, sufficient substantially to insolubilize the dried cellulose ether.

2. The method which comprises dissolving in a water solution of a water-soluble cellulose ether from about 10 to about 25 per cent of a water-soluble ethylene glycol modified urea-formaldehyde condensate, drying the mixture to remove water and heating the mixed solids to a temperature between about 90° and 170° C. for a period within the range from 150 to about 10 minutes, sufficient substantially to insolubilize the dried cellulose ether.

3. The method which comprises dissolving in a water solution of a water-soluble cellulose ether from about 10 to about 25 per cent of a water-soluble ethylene glycol modified urea-formaldehyde condensate prepared from 1 mole of urea, 1 to 5 moles of ethylene glycol and 3 moles of formaldehyde, drying the mixture to remove water and heating the mixed solids to a temperature between about 90° and 170° C. for a period within the range from 150 to about 10 minutes, sufficient substantially to insolubilize the dried cellulose ether.

4. The method which comprises dissolving in a water solution of a water-soluble cellulose ether from about 10 to about 25 per cent based on the weight of the said ether of a water-soluble ethylene glycol modified urea-formaldehyde condensate and an acidic catalyst in amount sufficient to produce in the water solution a pH in the range from about 4 to 5, drying the mixture to remove water and heating the mixed solids to a temperature between about 90° and 170° C. for a period within the range from 150 to about 10 minutes, sufficient substantially to insolubilize the dried cellulose ether.

5. The method which comprises dissolving in a water solution of a water-soluble cellulose ether from about 10 to about 25 per cent based on the weight of the said ether of a water-soluble ethylene glycol modified urea-formaldehyde condensate and a catalytic amount of phosphoric acid sufficient to produce in the water solution a pH in the range from about 4 to 5, drying the mixture to remove water and heating the mixed solids to a temperature between about 90° and 170° C. for a period within the range from 150 to about 10 minutes, sufficient substantially to insolubilize the dried cellulose ether.

6. The method which comprises dissolving in a water solution of a water-soluble cellulose ether from about 10 to about 25 per cent of a water-soluble ethylene glycol modified urea-formaldehyde condensate, drying the mixture to remove water and heating to a temperature of about 160° C. for a period sufficient substantially to insolubilize the dried cellulose ether.

7. The method which comprises dissolving in a water solution of a water-soluble cellulose ether from about 10 to about 25 per cent based on the weight of the said ether of a water-soluble ethylene glycol modified urea-formaldehyde condensate and a catalytic amount of phosphoric acid sufficient to produce in the water solution a pH in the range from about 4 to 5, drying the mixture to remove water and heating to a temperature of about 160° C. for a period of about 10 to 15 minutes sufficient substantially to insolubilize the dried cellulose ether.

8. The method as claimed in claim 1, wherein the cellulose ether is water-soluble methyl cellulose.

9. The method as claimed in claim 2, wherein the cellulose ether is water-soluble methyl cellulose.

10. The method as claimed in claim 3, wherein the cellulose ether is water-soluble methyl cellulose.

11. The method as claimed in claim 4, wherein the cellulose ether is water-soluble methyl cellulose.

12. The method as claimed in claim 5, wherein the cellulose ether is water-soluble methyl cellulose.

13. The method as claimed in claim 6, wherein the cellulose ether is water-soluble methyl cellulose.

14. The method as claimed in claim 7, wherein the cellulose ether is water-soluble methyl cellulose.

15. The substantially water-insoluble reaction product of a normally water-soluble cellulose ether and from about 10 to about 25 per cent, based on the weight of the cellulose ether, of a water-soluble polyhydric alcohol modified urea-formaldehyde condensate substantially identical with that obtained according to the method of claim 1.

16. The substantially water-insoluble reaction product of a normally water-soluble methyl cellulose and from about 10 to about 25 per cent, based on the weight of the methyl cellulose, of a water-soluble ethylene glycol modified urea-formaldehyde condensate substantially identical with that obtained according to the method of claim 1.

SHAILER L. BASS.
RICHARD M. UPRIGHT.